May 8, 1962 G. K. HAUSE 3,033,335
TRANSMISSION
Original Filed April 24, 1957 10 Sheets-Sheet 1

Figure 7:
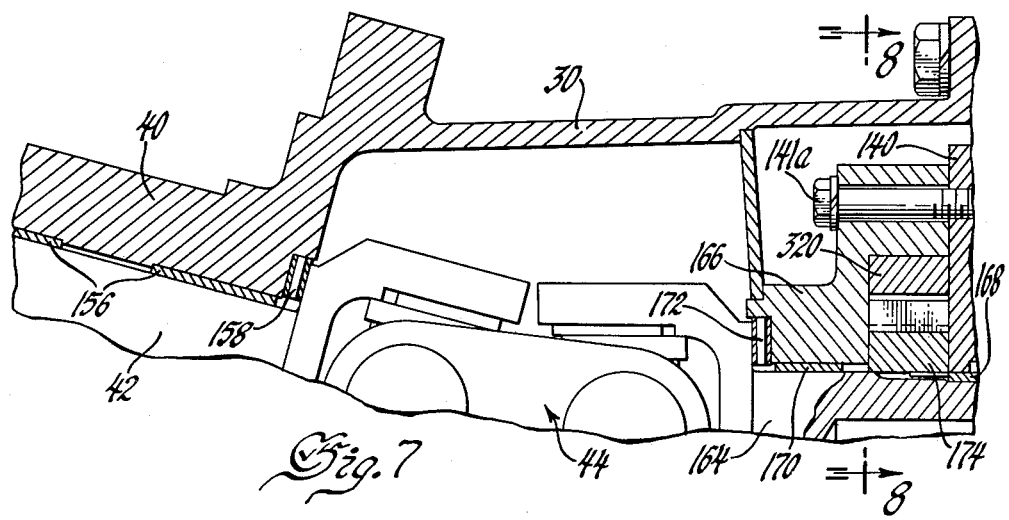
Figure 7A:
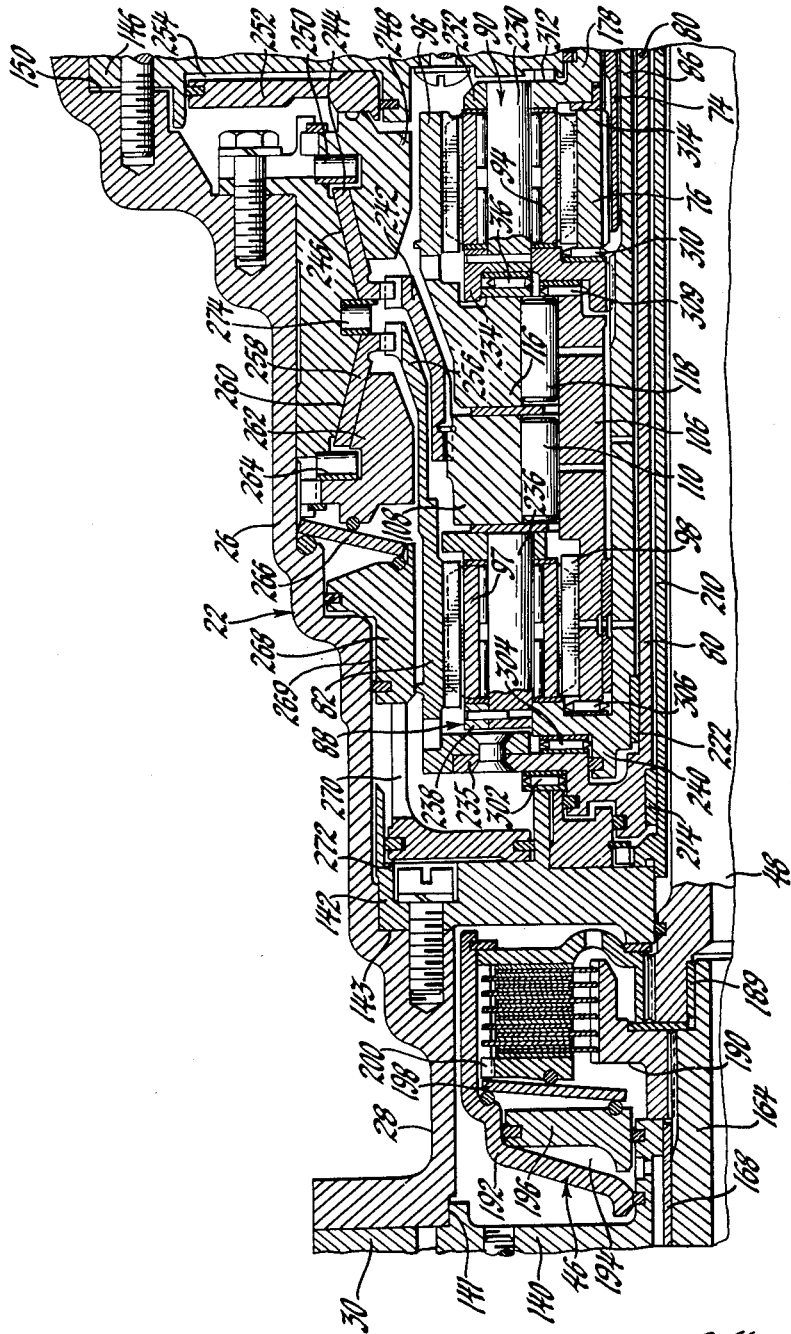
Figure 7C:
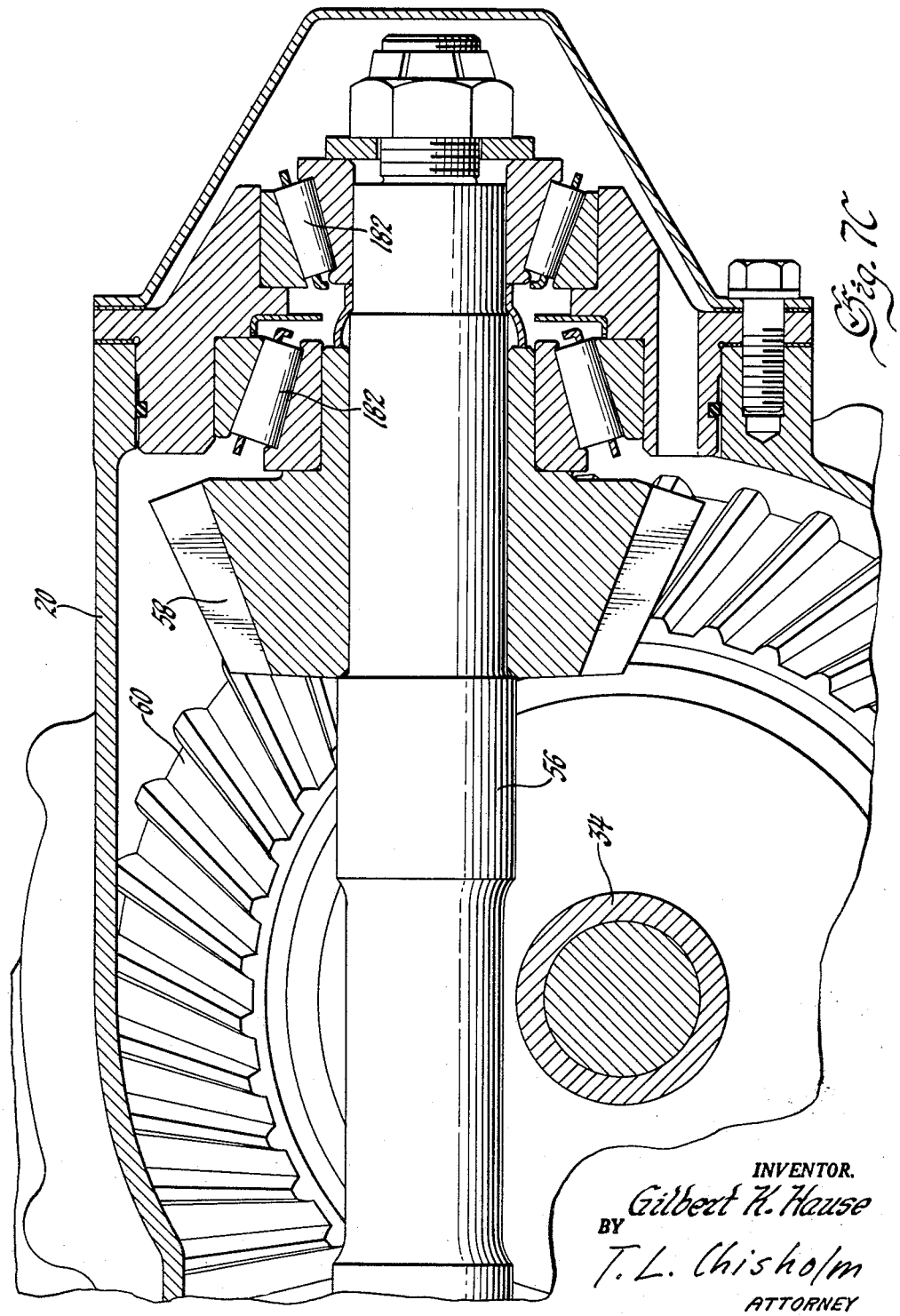

Fig.6 | Fig.7 | Fig.7A | Fig.7B | Fig.7C

INVENTOR.
Gilbert K. Hause
BY T. L. Chisholm
ATTORNEY

May 8, 1962

G. K. HAUSE 3,033,335

TRANSMISSION

Original Filed April 24, 1957

10 Sheets-Sheet 3

Inventor
Gilbert K. Hause
By T. L. Chisholm
Attorney

May 8, 1962 G. K. HAUSE 3,033,335
TRANSMISSION
Original Filed April 24, 1957 10 Sheets-Sheet 4

INVENTOR.
Gilbert K. Hause
BY
T. L. Chisholm
ATTORNEY

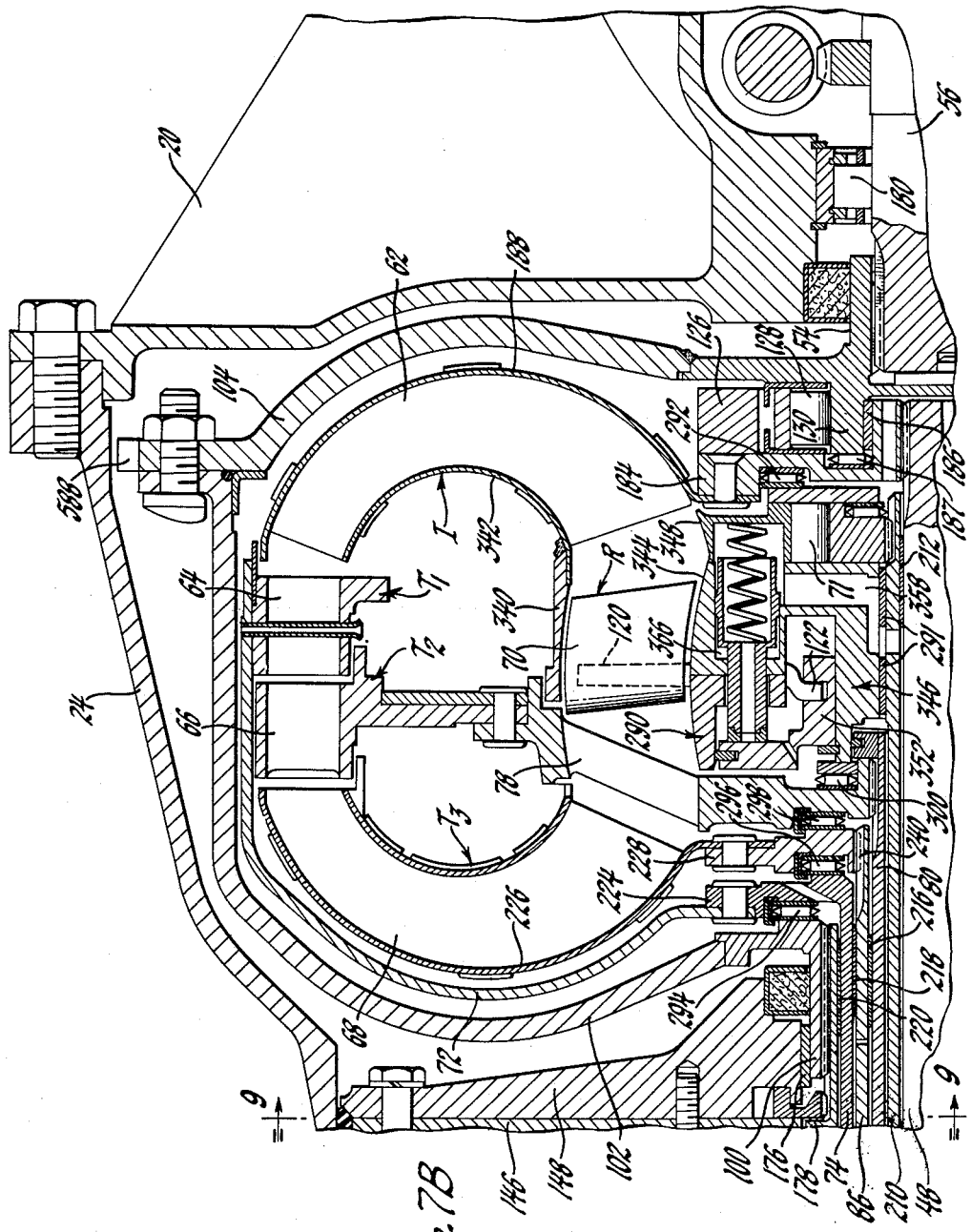

May 8, 1962 G. K. HAUSE 3,033,335
TRANSMISSION
Original Filed April 24, 1957 10 Sheets-Sheet 6

INVENTOR.
Gilbert K. Hause
BY T. L. Chisholm
ATTORNEY

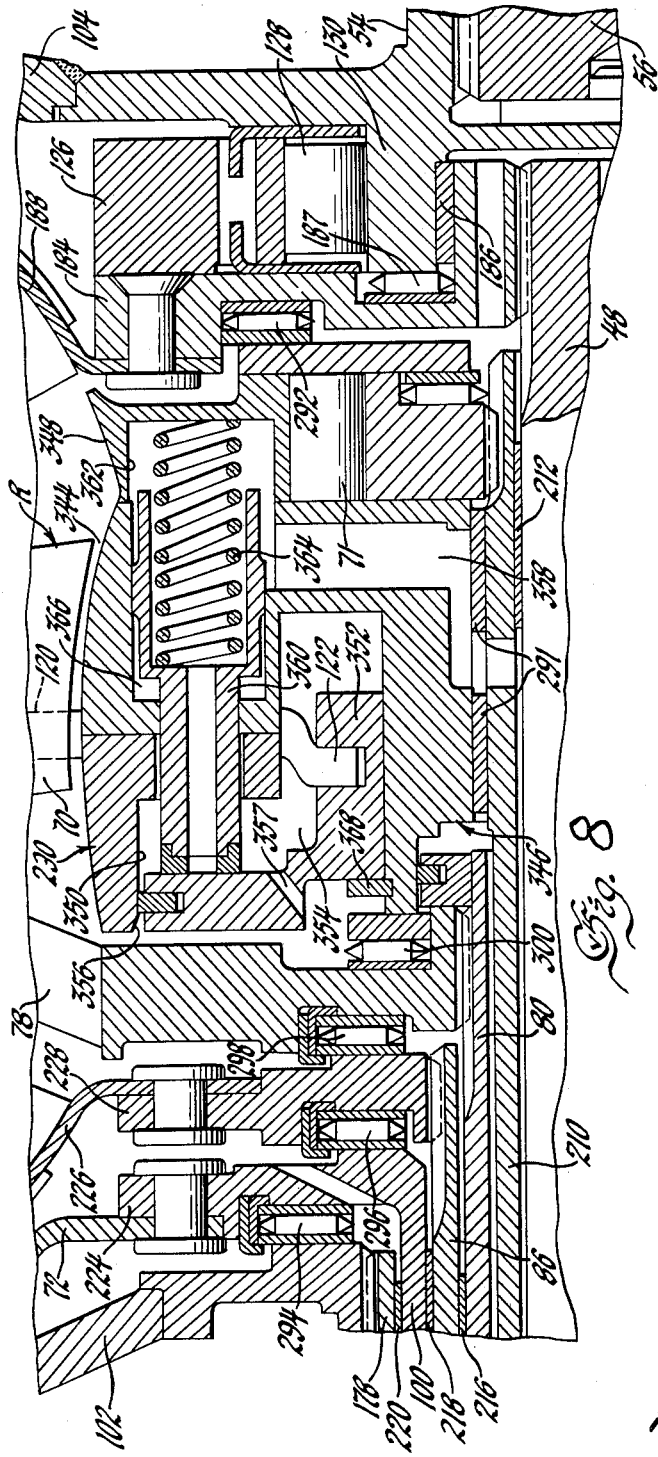

May 8, 1962 G. K. HAUSE 3,033,335
TRANSMISSION
Original Filed April 24, 1957 10 Sheets-Sheet 8

INVENTOR.
Gilbert K. Hause
BY
T. L. Chisholm
ATTORNEY

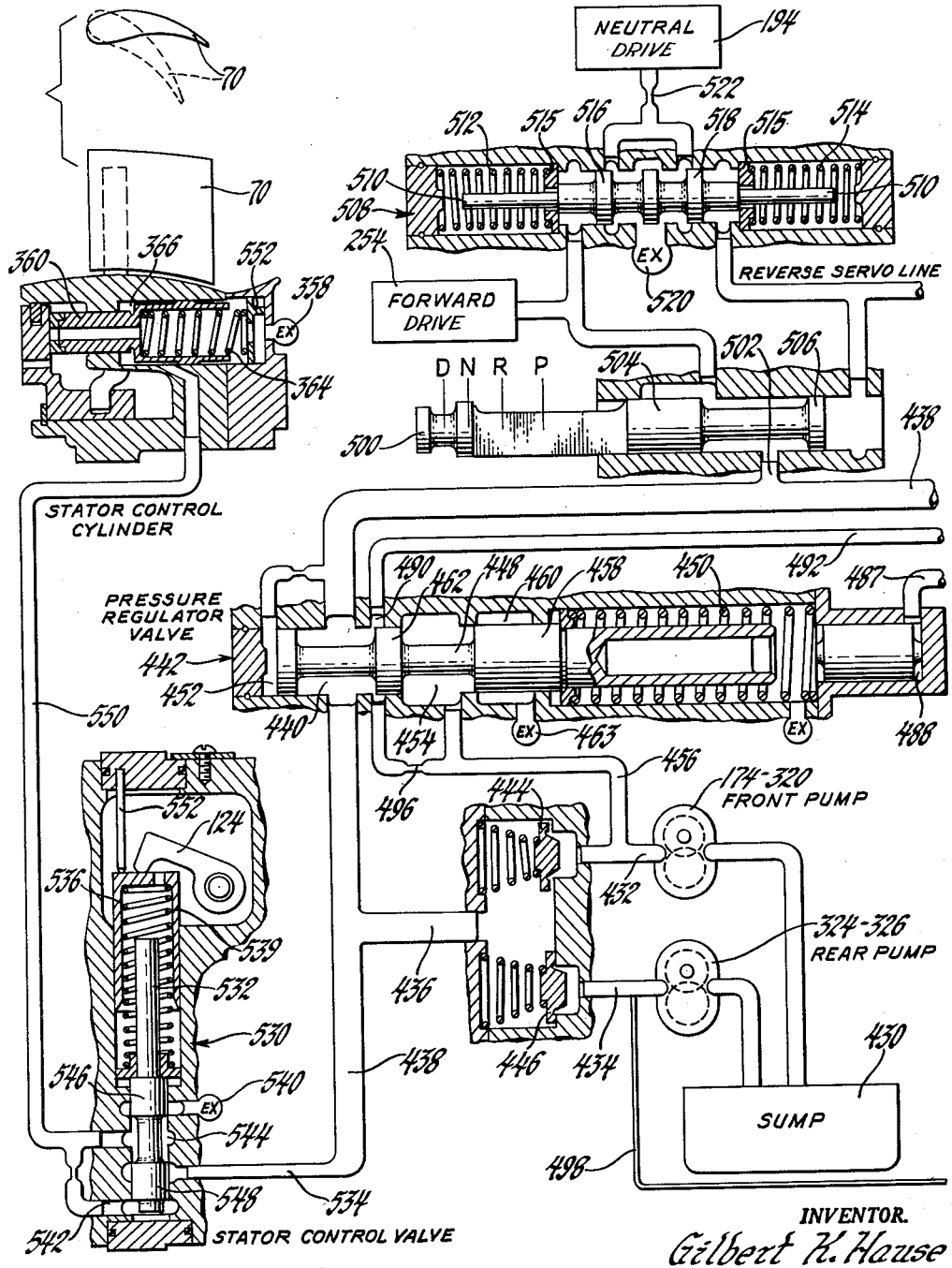

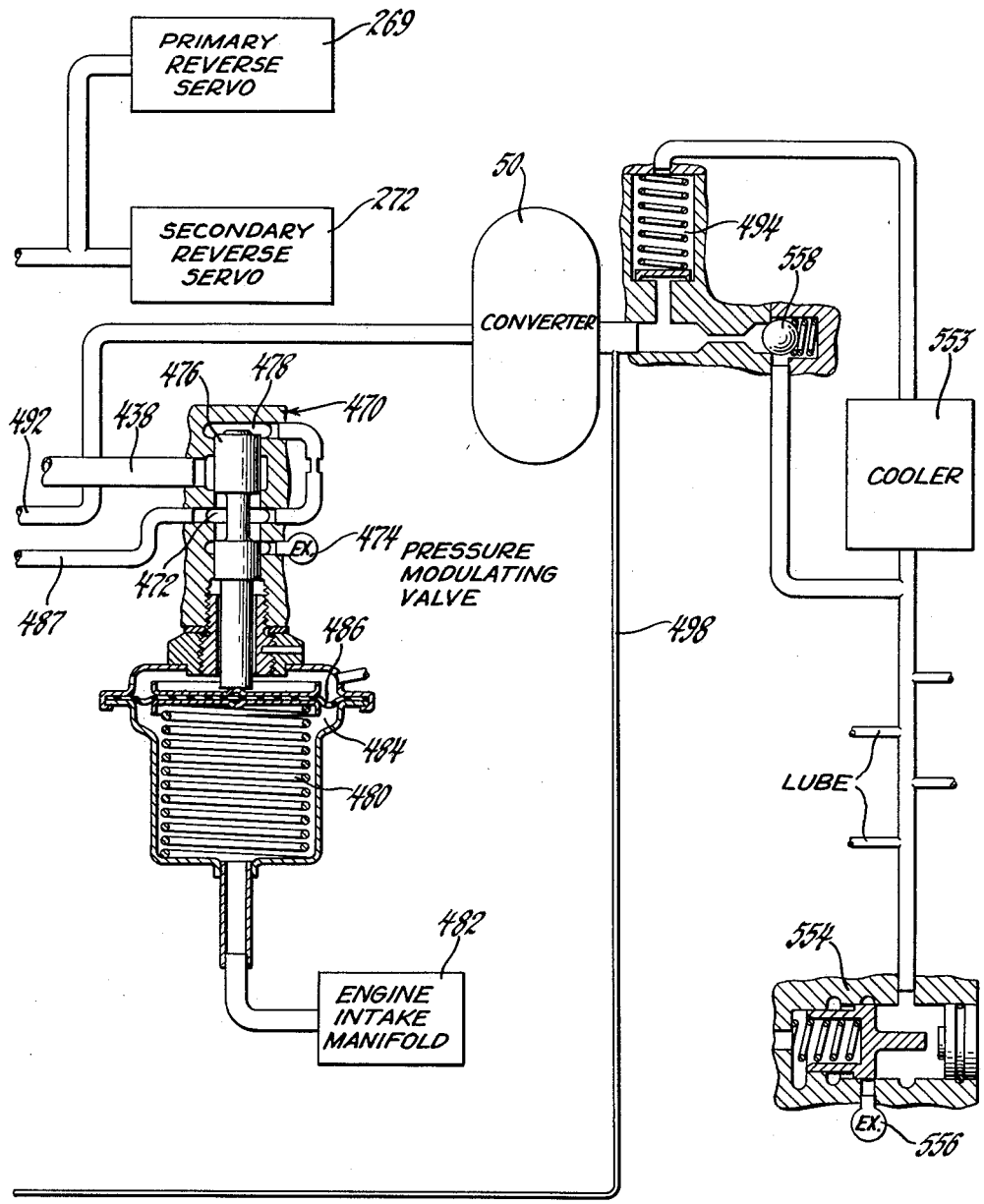

United States Patent Office 3,033,335
Patented May 8, 1962

3,033,335
TRANSMISSION
Gilbert Kenneth Hause, Bloomfield Hills, Mich., assignor to General Motors Corporation, Detroit, Mich., a corporation of Delaware
Original application Apr. 24, 1957, Ser. No. 654,771. Divided and this application Sept. 8, 1959, Ser. No. 838,736
6 Claims. (Cl. 192—3.2)

This invention relates to transmissions and final drives for automobiles, and is a division of my application, S.N. 654,771 filed Apr. 24, 1957.

Car designers are now trying to make cars low while providing adequate ground clearance. When this was attempted with the types and arrangements of transmission, propeller shaft and differential housing formerly available, it required the transmission and propeller shaft to be placed above the floor level of the car. Therefore, a so-called tunnel was used to separate the drive line from the interior of the car. The tunnel is undesirable, and efforts have been made to eliminate it or reduce its height. One such effort involves a unitary assembly of the transmission housing and differential housing which is placed in the space under the rear seat and tilted about the axis of the rear wheels to lower the front end of the transmission. This lowers the propeller shaft.

It is among the objects of the invention to provide an advantageous combination of transmission and final drive assembly which is especially suited to the low car design outlined above, and to provide an improved and novel form of transmission which makes this combination possible.

More specifically, objects of the invention are to provide an improved and compact form of transmission which facilitates increasing the length of the propeller shaft for a given car design and thus improving the angle of the propeller shaft with respect to engine and transmission, and to provide a transmission which has low ground clearance while providing high torque and a high degree of torque multiplication.

It is also an object to provide an improved construction and arrangement of hydrodynamic torque transmitter which makes possible the use of an overrunning clutch between the input and output shafts and one which provides improved flow characteristics of working liquid through the torque transmitter, and especially through a reaction member. The invention is particularly adapted to torque converters which multiply torque, but it is also applicable to hydrodynamic torque transmitters generally.

The invention defined in this divisional application also has among its objects the provision of an improved control system for the mechanical elements of the transmission which will provide improved and more flexible performance and smooth transition over a very wide range of torque multiplication.

More specifically it is an object to prevent sufficient diversion of oil from the pump or source of pressure to the torque transmitter cavity until there is assurance of sufficient pressure in any clutch to prevent slipping of the clutch, while assuring the constant delivery of an adequate supply of lubricating oil to the transmission.

These and other objects and advantages of the invention will appear in the following description and accompanying drawings.

Figure 1:
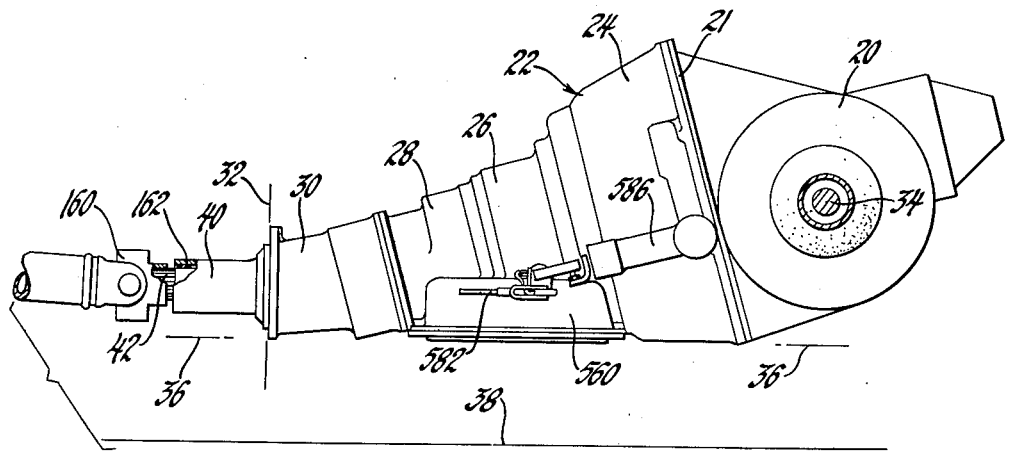
Figure 2:
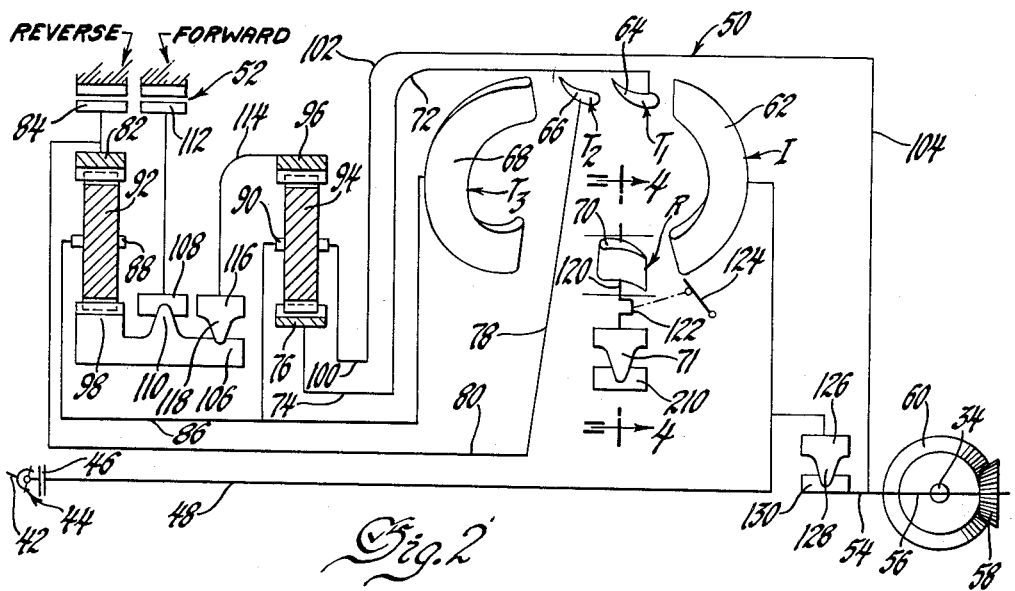
Figure 3:
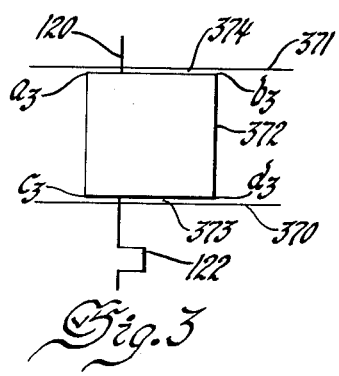
Figure 4:
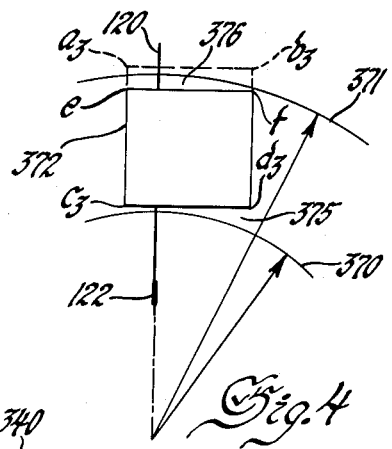
Figure 5:
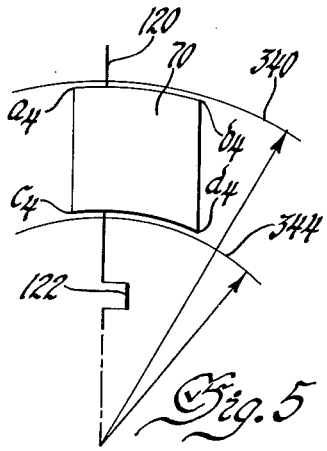
Figure 5A:
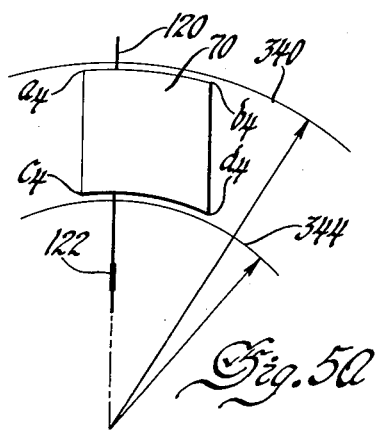
Figure 9:
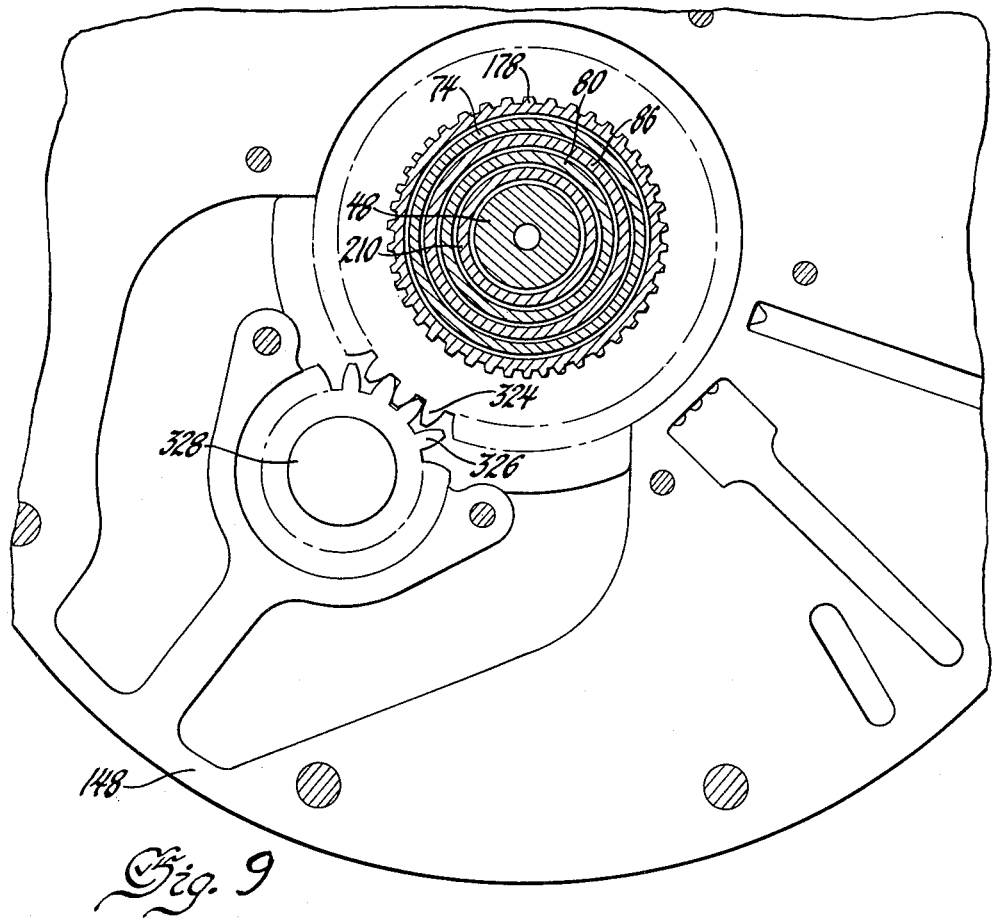

In the drawings:

FIG. 1 is a side elevation of a transmission and differential assembly embodying one form of the invention, showing the relationship of this assembly to the ground when the transmission is placed in a car, FIG. 2 is a schematic upper half of a longitudinal section which is symmetrical about the axis of rotation of a transmission and differential assembly embodying one form of the invention. In this and succeeding figures the transmission is shown with its axis parallel to the ground, for convenience in reading the drawings, this being a different position than shown in FIG. 1, FIG. 3 is a schematic section taken like FIG. 2 showing one form of reaction member in one position of adjustment, FIG. 4 is a fragment of a section on the line 4—4 of FIG. 2 showing a transverse view of the same form of reaction member as in FIG. 3 but in another position of adjustment, FIGS. 5 and 5A are sections corresponding to FIGS. 3 and 4, respectively, showing a different form of reaction member in positions of adjustment corresponding to FIGS. 3 and 4, FIG. 6 is a map showing the relative arrangement of the sheets of drawing which include FIGS. 7, 7A, 7B and 7C to constitute one-half of a structural section corresponding to FIG. 2, FIGS. 7, 7A, 7B and 7C collectively form the upper half of a symmetrical, longitudinal section of an actual structure of a transmission and differential assembly embodying one form of the invention, FIG. 7 is a section through the front end of the assembly, including the universal joint and front pump, FIG. 7A is a section through the gearing, behind the front pump and in front of the torque converter, FIG. 7B is a section through the torque converter, in front of the differential, FIG. 7C is a section through the differential, FIG. 8 is an enlarged detail view of a portion of FIG. 7B, FIG. 9 is a section of an output shaft driven pump or rear pump on the line 9—9 of FIG. 7B, and FIGS. 10 and 10A together form a diagram of the control system.

General Arrangement

Referring to FIG. 1 the transmission and differential assembly includes a differential housing 20 having a generally circular front wall 21 to which is bolted a transmission housing designated as a whole by 22 which includes a torque transmitter housing 24, a gear housing 26, a clutch housing 28 and may include a universal joint housing 30, all secured together in any suitable manner from rear to front in the order named.

The transmission housing 22 is of tapering form and can in general be contained within a truncated cone whose larger base is the front wall 21 of the differential housing 20, and whose smaller base is a circle in a plane whose trace in FIG. 1 is the line 32 at the front end of the universal joint housing 30. The entire assembly can be rotated about the axis of the drive axles 34 and may be placed in the car so that the lowermost geometrical element of the truncated cone, which element is represented by the broken line 36, is disposed substantially parallel to the level surface of the ground 38. This arrangement makes it possible for the largest part of the transmission housing to be placed in the space behind the rear seat of a car without taking up any room above the normal lower surface of the car body and permits the customary propeller shaft of the car to enter the transmission housing at an angle to place the propeller shaft as low as possible with respect to the car body and thus reduce the height of, or eliminate, any tunnel in the car floor which may be necessary to accommodate the propeller shaft or its housing. To this end the universal joint housing includes a bearing retainer 40 for the drive shaft disposed at an angle to the axis of the transmission to receive a propeller shaft which is substantially parallel to the ground.

The transmission housing encloses a transmission schematically shown in FIG. 2 and structurally illustrated in FIGS. 7, 7A and 7B.

Referring to FIG. 2 a power input shaft 42, which may be connected to, or a part of, a customary propeller shaft driven by the engine of the car, is connected to a universal joint 44 which through torque-establishing device 46 can selectively be connected to or disconnected from a transmission input shaft 48 which drives a hydrodynamic torque transmitter, preferably a torque converter 50, which drives a planetary forward and reverse reduction gearing 52 physically disposed between the torque converter and the clutch 46. The gearing drives a transmission output shaft 54 connected to the input shaft 56 of the differential and driving the input pinion gear 58 which meshes with the differential ring gear 60 which drives the axles 34 of the rear wheels in any suitable known manner.

The invention includes novel features in the construction and arrangement of the torque converter, in the construction and arrangement of the reduction gearing separately and in combination with a torque converter, and in the arrangement of the torque converter and its output shaft with reference to the differential.

The torque converter includes a pump or impeller I of generally known form represented diagrammatically in FIG. 2 by a single blade 62 which may be rotated by the input shaft 48.

A first turbine $T_1$ is represented in FIG. 2 by a single blade 64 which receives liquid from the pump and discharges it to a second turbine $T_2$ represented by blade 66, which in turn discharges the liquid to a third turbine represented by blade 68 which returns the liquid to the impeller I through a stator or reaction member R represented by blade 70 and controlled for forward rotation only by a ratchet device 71.

The first turbine $T_1$ is connected by a drum 72 and shaft 74 to drive the input sun gear 76 of a first or rear planetary gear set. The second turbine $T_2$ is connected by a spider 78 and shaft 80 to drive the input ring gear 82 of a second or front planetary gear set. The ring gear can be held fast by a reverse torque-establishing device 84 to effect reverse drive, as will be explained. The third turbine $T_3$ is connected by a shaft 86 to drive the carriers 88 and 90, respectively, of the front and rear planetary gear sets, which carriers support front planetary pinions 92 meshing with the front input ring gear 82 and rear planetary pinions 94 which mesh with the rear input sun gear 76. A rear reaction ring gear 96 meshing with planet pinions 94 completes the rear planetary gear set, and a reaction sun gear 98 meshing with the planet pinions 92 completes the front planetary gear set.

The $T_3$ shaft 86 is the principal output shaft of the torque converter, and through carrier 90 it is connected to a transmission output member 100 physically located between the torque converter and the gearing. A drum 102 and flange 104 collectively form a casing surrounding the torque converter, which casing connects the output member 100 to the transmission output shaft 54.

Heretofore the various definitions of the terms clutch and brake have caused confusion. Some attempts to define the terms have been based on use or function regardless of structure while others have been based on type of structure or arrangement, regardless of use or function. This has sometimes led to the definitions of clutch and brake being mutually exclusive where they should not be, and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch as described by reference to structure where the point in interest is the function of the device regardless of its structure. To avoid this confusion and indefiniteness the term torque-establishing device is used herein generically to mean any device which can be engaged to prevent rotation between two members which otherwise are relatively rotatable. If both members are rotatable absolutely the torque-establishing device when engaged forces them to rotate at the same speed so that one member drives the other. In this case the torque-establishing device may be defined more specifically as a drive clutch. If one of the members is fixed then engagement of the clutch holds the other member fast, in which case the generic torque-establishing device is sometimes referred to as a brake or lock. Where the torque-establishing device prevents relative rotation between two members in one sense but permits relative rotation in the opposite sense then the torque-establishing device may be sub-generically defined as a one-way clutch or ratchet device which is used to mean any device between two relatively rotatable members which permits the first member to rotate in one sense with respect to the second member but prevents the first member from rotating in the opposite sense with respect to the second member, that is, locks the two members together. This device is sometimes called a freewheeler. If both members are rotatable absolutely the freewheeler is a one-way drive clutch. If one of the members cannot rotate, the freewheeler is sometimes called a one-way brake.

The sun gear 98 is formed integral with a freewheeler member 106, the upper half of which, as represented in FIG. 2 can turn forward, that is out of the plane of the paper toward the eye of the observer with respect to a second freewheeler member 108. The freewheeler is completed, as symbolically represented in FIG. 2, by a ratchet member 110 which is fixed to the member 106 and engages the member 108 if the member 106 tends to rotate backward. The member 108 is rotationally fixed to a forward drive torque-establishing device 112 which can be held to prevent rotation of the freewheeler element 108. When this occurs the sun gear 98 is positively held against reverse rotation but may rotate forward with respect to the ratchet device 106—110—108. The rear ring gear 96 is rotationally fixed through a drum 114 to a member 116 of a second ratchet device having a ratchet element 118 which engages the member 106 whenever the member 116 tends to rotate backward but permits the ratchet member 116 to rotate forward out of the plane of the paper toward the eye of the observer with respect to the ratchet member 106. In the structure described herein the freewheelers 106—110—108 and 106—118—116 are both generically one-way torque-establishing devices. Both freewheelers always function as the species sometimes called brake when the forward torque-establishing device 112 is set. However, when the forward torque-establishing device 112 is released and the reverse torque-establishing device 84 is set, the ring gear 96 can drive the sun gear 98 backward through the freewheeler 106—118—116 which functions as a one-way drive clutch and not as a one-way brake.

The stator blades 70 are each mounted on a spindle 120 having a crank 122 suitably connected to the throttle 124 of the engine which drives the car so that the blades can be positioned to vary according to the torque demand on the engine the range of torque multiplication effected by the torque converter.

In order to prevent the car running faster than the engine and thus in order to provide engine braking, I place a freewheeler between the input shaft 48 and the output shaft 54. This is represented schematically in FIG. 2 by the member 126 secured to the drive shaft 48 and fixed to a ratchet member 128 which engages member 130 secured to the shaft 54. Whenever the output shaft tends to rotate faster than the input shaft 48, the freewheeler 130—128—126 locks to cause the car to drive the engine.

Structural Arrangement

As shown in FIGS. 7, 7A, 7B, the transmission housing 22 may include a single tapered casing extending from the differential housing 20 to the universal joint housing 30, provided with shoulders to which may be fastened partitions dividing the transmission housing into the component housings which contain the torque converter, gearing and clutch. The universal joint housing 30 has the smallest average diameter of the entire group of housings, and it is separated from the rest of the transmission housing by a flange 140 piloted by a rib 141 in the left end of the clutch housing 28 (FIG. 7A) and secured by bolts. A second flange 142 (FIG. 7A) bolted to a shoulder 143 in the main casting separates the clutch housing 28 from the gear housing 26, which in turn is separated from the torque converter housing by a third partition formed by a pair of flanges 146 and 148 bolted to a shoulder 150.

Tapering torque converter casing 24 has a mean or average diameter larger than the greatest diameter of the gear housing 26, whose mean diameter is larger than the mean diameter of the clutch housing 28 which in turn is larger than the mean diameter of the U-joint housing 30.

As shown in FIG. 7, at the front end of the transmission, the drive shaft 42 is supported in the bearing retainer 40 of the universal joint housing 30 by spaced radial bearings 156 and a thrust bearing 158 which latter is preferably of the roller or anti-friction type. The front end of the shaft 42 is splined to a flange 160 by which the shaft 42 may be connected to any suitable propeller shaft, not shown. The flange 160 may be sealed to the housing 40 by any suitable seal 162. The rear end of the shaft 42 forms one end of the universal joint 44, the rear end of which is formed by a clutch input shaft 164 which latter is supported in the universal joint housing in the following way.

A pump casing 166 is dowelled and bolted to the flange 140, which latter includes a tubular portion which contains a bearing sleeve 168 in alignment with a second bearing sleeve 170 in a bore of the pump casing 166. The bearings 168 and 170 radially support the clutch input shaft 164 which is also supported against axial thrust by a thrust bearing 172 similar to the thrust bearing 158. The device as so far described supports the drive shaft 42, clutch input shaft 164, and universal joint 44 radially and axially against thrust in opposite directions. A pump gear 174 is splined to the clutch input shaft and forms part of the customary engine driven or front pump for supplying oil to the transmission, as will be explained.

Referring now to the output device of the transmission, as shown in FIG. 7B the transmission output member 100 is a sleeve formed with an integral radial flange welded to the output shell or casing 102 and splined to a sleeve 178 integral with or secured to a part of the rear planet carrier 90, as will be explained. The sleeve 100 is supported for rotation in a radial bearing 176 in the flange 148. The shell 102 extends around the torque converter and bolted to the flange 104 which is integral with or secured to a central tubular shaft or socket 54 which is the previously mentioned final output shaft 54 of the transmission shown diagrammatically in FIG. 2. The shaft 54 is splined to the differential input shaft 56 which is supported in the differential housing by a front radial bearing 180 and rear radial and thrust bearings 182. Thus the entire output assembly of the transmission consisting of output member 100, shell 102, flange 104 and final output shaft 54 is positioned and supported for rotation in the casing 22 by the front bearing sleeve 176 and by the differential bearings 180, 182 through the differential input shaft 56. A portion of the shaft 54 extends to the left inside the flange 104 to form the previously mentioned inner race 130 of the one-way clutch diagrammatically illustrated in FIG. 2. The outer race 126 of this clutch takes the form of the ring 126 shown in FIG. 7B which surrounds one-way rollers or sprags 128 which are the ratchet members 128 of FIG. 2. The outer race is fixed to a flange 184 which flange is supported for rotation on the inner side of the portion 130 of the shaft 54 by a radial bearing sleeve 186 and is splined to the right-hand end of the transmission input shaft 48. This supports the right-hand end of the shaft for rotation through the bearing sleeve 186 and transmission output shaft 54, differential input shaft 56 and its bearings 180 and 182. The flange 184 is supported against axial thrust by an anti-friction thrust bearing 187 running against the transmission output shaft 54. In the impeller, the customary outer shell 188 carrying impeller blades 62 is riveted to the flange 184 and thus is connected to input shaft 48, the left-hand or front end of which is supported for rotation on the radial bearing sleeve 189 on the end of the clutch input shaft 164 which has been described as supported for rotation from the casing of the transmission by the bearings 168 and 170 (FIG. 7A).

The torque-establishing device in the form of the neutral clutch 46 in the clutch housing 28 includes an internal clutch drum 190 splined to the clutch input shaft 164 and carrying driving plates or disks which are interleaved with driven plates or disks carried by an external clutch drum 192 splined to the front end of the transmission input shaft 48. The clutch may be engaged by fluid under pressure in an expandable chamber 194 enclosed in the external clutch drum 192 by a piston 196 which operates any suitable force multiplying device, such as a Belleville washer or spring 198 to urge a clamping plate 200 to the right to engage the driving and driven plates. The Belleville spring forms the return mechanism for the piston 196 when the pressure in chamber 194 is released.

The various shafts of the torque converter and gearing will be described in the order in which they are placed with reference to the axis of the transmission.

The transmission input shaft 48 is at the axis. Surrounding the input shaft and spaced from it to form a stator control passage is a stator support or ground sleeve 210 which extends forward through the gearing and is piloted at its front end in the partition 142 and fixed against rotation. The right or rear end of the sleeve 210 is supported by a bearing sleeve 212 on the transmission input shaft 48. The second turbine shaft 80 outside the ground sleeve 210 is radially supported for rotation at its front end by a bearing sleeve 214 on the front end of the ground sleeve 210, and at its rear end by a bearing sleeve 216 in the rear end of the third turbine shaft 86 which in turn is supported by a bearing sleeve 218 in the rear end of the first turbine shaft 74 which in turn is supported by bearing sleeve 220 in the output sleeve 178, referred to, which in turn is supported by the bearing 176. Thus the rear ends of all of the rotating turbine assemblies are supported radially from the transmission housing 22 by the flange 148 and the stack of bearings 176—220—218—216. The third turbine shaft 86 extends forward through both gear sets and is supported at its left end for rotation by a bearing sleeve 222 on the second turbine shaft 80.

The first turbine blades 64 are fixed to the first turbine shaft 74 by being attached to the shell 72 which is disposed just inside the shell 102 and at its center is riveted to a flange or hub 224 which may be integral with the shaft 74.

The second turbine $T_2$ is attached to its output shaft 80 through the spider 78 which at its center is splined to the rear end of the shaft 80.

The third turbine blades 68 are secured to an outer shell 226 which latter is riveted to a hub 228 splined to the right end of the $T_3$ shaft 86.

The $T_1$ shaft 74 extends forward from the torque converter to the rear planetary gear set and at its front end is splined to the sun gear 76 which meshes with the planet pinions 94 journaled on the carrier 90. This carrier includes spindles 230 supported between a rear flange 232 formed integral with the output sleeve 178 and a front flange 234 which is splined to the $T_3$ shaft 86. The $T_2$ shaft 80 extends forward through both planetary gear sets, and is formed with an integral flange 235 at its front end which is riveted to the ring gear 82. The front planet gears 92 are mounted on the front carrier 88 which includes spindles 236 supported in a front flange 238 splined to a flange 240 integral with the $T_3$ shaft 86. The front sun gear 98 is formed integral with the freewheeler sleeve 106 and this supports side by side the two sets of rollers or sprags 110 and 118 which are the ratchet members 110 and 118 diagrammatically illustrated in FIG. 2. Thus the sleeve 106 forms the center race for the two freewheelers 106—110—108 and 106—118—116. Outside the ratchet members 118 is the rear or inner race 116 which is splined to the rear ring gear 96. The forward freewheeler includes the forward or outer race 108, previously referred to, which is splined to drum 242 splined to a conical drum 244 which corresponds to the torque-establishing device 112 in FIG. 2. The race 108 of the front freewheeler can be positively held against rotation by clamping the drum 244 between a stationary cone 246 secured to the transmission casing and a nonrotatable but slideable cone 248 which may be urged to the left, to overcome a return spring 250, by an annular piston 252 which can be urged forward by the pressure of oil supplied by any suitable means to an expandable chamber 254 formed in the flange 146.

The front ring gear 82 is formed integral with a drum 256 splined to a conical brake drum 258 (corresponding to the reverse brake 84 in FIG. 2) which may be held by clamping between a stationary cone 260 secured to the transmission casing and a nonrotatable but slideable cone 262 which may be urged to the right to overcome the return spring 264 by a force multiplying actuator such as a Belleville washer or spring 266 which can be urged to the right by a primary piston 268 movable by fluid pressure in a cylinder 269 and assisted by a secondary piston 270 actuated by fluid pressure in an expandable chamber 272 formed in the flange 142. A return spring 274 between the cones 244 and 258 assures disengagement of either cone when its energizing actuator is released.

FIG. 9 is a section of the rear pump which is the source of oil under pressure operating in response to movement of the vehicle. This pump may be of any known form, for example including an external gear 324 splined to the previously described sleeve 178 which is connected to the output of the transmission. The gear 324 meshes with a second external gear 326 turning on a shaft 328. The two gears are disposed in a cavity in the flange 148 and arranged to provide intake and pressure delivery chambers as is known.

As shown in FIG. 7B, the crank shafts 120 are journalled in the support 290 and carry the blades 70 between the support and a shroud 340 welded to the inner shroud 342 of the impeller. The stator support 290 is rotatable about the axis of the transmission but only forward, as is known. The support 290 has an outer wall having a surface 344 jointed to an inner cylindrical wall 346 by a thick annular or radial wall 348 to form an open-ended annular cylinder 350. The support 290 turns on the bearings 291 on the ground sleeve 210 and is prevented from rotating backward by any suitable one-way torque-establishing device including the one-way rollers or sprags 71 which are the ratchet members 71 in FIG. 2.

Each crank 122 is located in an annular groove in an annular piston 352 which slides in the annular cylinder 350 and divides the cylinder into two pressure chambers or expansible chamber motors 354 and 356 for positioning the piston and therefore the stator blades. The chamber 356 is constantly open to the torque converter so that converter pressure always urges the piston toward the right, which is the position of highest blade angle. In this angle the blades make the greatest change of direction of oil flowing from the turbine $T_3$ to the impeller I through the working circuit and thus provide the greatest range of torque multiplication. Pressure in the chamber 354 can stop movement of the piston to the right but can never move the piston to the left because the chamber 354 is supplied with oil under pressure only through a small opening 357 in the piston so that the pressure in the chamber 354 can never exceed the pressure in chamber 356. The blades 70 have a larger area on the downstream side of the shafts 120 than on the upstream side, the downstream side being the right-hand side of the shaft 120, as seen in FIG. 7B. Consequently, the hydraulic force of oil circulating in the torque converter constantly urges the blades to low angle, that is, urges the piston to the left. The apparatus is so proportioned that when there is no pressure in the chamber 354, the pressure maintained in the converter and chamber 356 is sufficient to overcome the hydrodynamic force on the blades 70 and move the blades to their highest angle and this can occur throughout the entire operating range of the torque converter.

The chamber 354 forms with the piston and cylinder an expansible chamber motor for opposing movement of the piston to the right and consequently movement of the blades toward high angle. At some value of pressure in chamber 354 less than the pressure in chamber 356, the force on the piston 352 of the pressure in chamber 356, plus the hydraulic force on the blades 70 equals the force on the piston of pressure in chamber 354 and this holds the blades in one particular position.

Whenever the chamber 354 is vented, the converter pressure in chamber 356 moves the piston to the right and increases the angle of the blades. The chamber 354 may be vented through a tube 360 axially slideable in a bore 362 in the thick radial wall 348, the tube 360 forming a movable inlet for an exhaust conduit connected to the bore 362 as will be explained. When the chamber 354 is vented, the piston moves toward the right until it strikes the end of the tube 360 and this closes the vent.

The transmission includes means for positioning the tube 360 so as to close the vent and hold the stator blades as desired or automatically in accordance with operating conditions. The tube 360 is constantly urged to the left by a spring 364 and may be urged to the right against the force of the spring by pressure in an expansible chamber 366 formed between the tube 360 and the portions of large and small diameters of the bore 362. The pressure existing in the chamber 366 (called the throttle control chamber) determines the position of the tube against the force of the spring and this in turn determines the position of the stator blades as will now be explained.

Suppose that the pressure in chambers 354 and 356 has been equalized, that there is no pressure in throttle control chamber 366. Then the piston is moved against the stop ring 368 by the hydraulic force on the blades 70. The blades are now at lowest angle. The spring 364 presses the tube 360 as far as it will go to the left, that is until the end of the tube is closed by the piston. If it is desired to increase the angle of the stator blades, fluid under pressure is admitted to the chamber 366 through a suitable control conduit which will be explained. This pressure moves the tube 360 to the right against the spring 364 and each particular value of pressure holds the tube in a particular position. This allows oil to flow from the chamber 354 faster than it can be supplied through the passage 357 in the piston and this vents the chamber 354 or reduces its pressure so that pressure in the chamber 356 moves the piston 352 to the right as fast as the outflow of oil will permit, until the piston again meets the tube 360. This closes the inlet of the exhaust conduit and stops further flow of oil from the chamber 354 and this holds the piston against the tube 360.

Maintaining the piston in any particular position requires maintaining the pressure in chamber 354 at a sufficient value below the pressure in the converter so that the force on the right-hand side of the piston due to the pressure in chamber 354, plus the force on the blades 70 just balances the force of converter pressure on the left of the piston. The force on the blades 70 depends upon the angle of blades, the speed of rotation of the pump, and other factors.

As the vent into tube 360 is closed by the piston, oil flowing into chamber 354 through opening 357 begins to increase the pressure in chamber 354 toward the value of converter pressure. When the sum of the force of the pressure in chamber 354 on piston 352 and the hydrodynamic force on the blades exceeds the force of pressure in chamber 356 on the piston, the piston will move away from the tube 360 which remains held by the spring 364 and pressure in throttle control chamber 366. This slightly opens the vent which then again reduces the pressure in chamber 354 and permits the converter pressure to return the piston to its position against the tube. The piston thus hunts or hovers in a narrow range of movement between complete closing and slight opening of the vent tube 360 and this holds the stator blades 70 in a position determined by the position of the tube which, as previously explained, is determined by the pressure in chamber 366. In order to increase the angle of the blades 70 and thereby increase the performance or range of torque multiplication of the torque converter, I merely increase pressure in chamber 366 in any suitable manner and conversely to decrease the stator blade angles I reduce the pressure. This can be done either manually at the will of the driver of the car or automatically in accordance with driving conditions, for example by means of the control system illustrated in FIGS. 10, 10A.

One of the objects of the invention is to increase the effectiveness of the stator in increasing the torque ratio and to avoid decreasing the rate of increase of torque ratio as the angle of the blades is increased. Therefore, a feature of the construction of the reaction member in this transmission is the arrangement of flow surfaces so that a substantially constant spacing is maintained between the ends of the stator blades 70 and the surfaces which direct or confine the oil flow between the third turbine $T_3$ and the impeller I. This is diagrammatically illustrated in FIGS. 3 to 5A. It is customary to provide an inner substantially cylindrical wall 370 and an outer substantially cylindrical wall 371 which together form an annular passage for the oil flowing from the turbine to the impeller. These walls correspond functionally to the surfaces 344 and 340 respectively in FIG. 7B. FIG. 3 is an enlarged section taken as FIG. 2 is taken showing diagrammatically the relationship between the walls 370 and 371 and a projection 372 on an axial plane of a stator blade 70. In this view the traces of the surfaces 370 and 371 are straight lines. If the top edge $a3$—$b3$ of the projection of the stator blade 70 and the bottom edge $c3$—$d3$ are straight parallel lines, then when the principal plane of the stator blade is parallel to the axis of the transmission there will be a clearance 373 between the inner or bottom edge of the stator blade and the wall 370 and a clearance 374 between the top edge of the stator blade and the wall 371. These clearances will be substantially constant through the length of the stator blade.

FIG. 4 is a section of the line 4—4 of FIG. 2 showing the traces of the walls 370 and 371 as circles. From this it is apparent that the blade shown in FIG. 3 will be too wide radially to be turned parallel to the trace of the transverse plane through the section line 4—4 because the corner $b3$ would strike the wall 371. Consequently, in order to permit turning the blade, the blade must be made shorter than in FIG. 3 as represented by a square $c3$, $d3$, $f$, $e$. Where the blade is so shortened it not only has a smaller effective area, but there is a large gap or clearance 375 between the corner 43 and the wall 370 and there is also a gap 376 between the wall 371 and the center of the upper edge $ef$ of the blade. These clearances further reduce the effectiveness of the stator in changing the direction of oil and thus reduce the effectiveness of the torque converter in multiplying torque.

In this transmission the above described disadvantages are avoided by constructing the stator blades and the surfaces 344 and 340 corresponding to 370 and 371, respectively, as shown diagrammatically in FIGS. 5 and 5A and structurally in FIG. 7B. The surfaces 344 and 340 are formed as portions of the surfaces of concentric spheres whose center is at the intersection of the axes of the spindles 120 and the axis of shaft 48. Consequently, when a section is taken either transversely to the axis as in FIG. 5A or through the axis as in FIG. 5, or at any position in between, the traces of the walls 344 and 340 will be concentric circles whose center is on the axis of rotation of the spindle 120. The upper edge $a4$, $b4$ and the lower edge $c4$, $d4$ of the stator blade are also concentric circles whose center is on the axis of the spindle 120 and whose radii differ from the radii of the spheres forming the walls 344 and 340 to provide sufficient clearances to permit movement of the stator blade. This clearance can be small enough so that the blade practically forms a seal with the walls 344 and 340 in all positions of the stator blade. This materially increases the effectiveness of the stator blade both by permitting the larger effective area in a given size of torque converter and keeping the clearances small and constant. This increases the torque multiplying range of any converter having a given diameter.

Control System

The structure described above can be operated by any suitable controls which select forward, neutral and reverse and which place the stator blades in the desired position either manually or automatically but I prefer to place the stator blades continuously in position according to the torque or power demand on the engine.

Referring to FIG. 10, the front pump 174—320, when the engine is running, constitutes a source of fluid under pressure for operating the control system. This pump may be of any suitable known type and is designed to maintain a constant pressure, which pressure may, however, be adjusted or modulated with changes of torque demand on the engine by suitable known controls. In addition, a rear pump 324—326 suitably driven by the output member 178, as is known, maintains pressure when the car is running forward. This constitutes means for supplying fluid under pressure in response to movement of the vehicle. Both pumps take in oil from a common intake or sump 430 and their outlets 432 and 434 discharge to a common outlet 436 which leads to the main hydraulic control line 438 through a regulated pressure chamber 440 in a pressure regulator valve generally denoted by 442. The front pump is connected to the common outlet 436 through a check valve 444 and the rear pump is connected to the common outlet through a check valve 446 so that when one pump is not operating the other pump can supply oil to the system and will not be vented significantly through the idle pump.

The pressure regulator valve 442 includes a valve stem 448 constantly urged to the left by a spring 450 against the force of pressure in a regulating chamber 452 which is connected to the main line 438. Pressure in the regulating chamber 452 urges the valve stem to the right with a force which is proportional to the pressure in the main line 438. The front pump outlet 432 is also connected to a pump selector chamber 454 by a passage 456 independent of the check valves. When the pressure of oil from both pumps reaches a predetermined value, which can occur when the engine is running and the car has reached a predetermined speed, the valve stem 448 has moved to the right far enough to permit a land 458 to connect the pump selector chamber 454 with a venting chamber 460 which is connected to the sump 430 through a vent or exhaust port 463. When this occurs the front pump is vented to the sump and this reduces the pressure maintained by the front pump thus reducing the load on the engine and permitting the rear pump to supply the requirements of the system through check valve 446, the check valve 444 being closed. The pressure regulator valve tends to maintain a constant pressure in the line 438, as is known. If the pressure tends to increase above a predetermined maximum, the stem 448 moves to the right far enough to permit a land 462 to vent the regulated pressure chamber 440 through the pump selector chamber 454 which has previously been connected to vent chamber 460 by the land 458. If the pressure tends to decrease below a predetermined minimum, the stem 448 moves to the left until land 462 closes the vent.

The pressure maintained in the line 438 may be reduced below the value otherwise maintained by the regulator 442, in response to low torque demand on the engine by any suitable torque demand responsive regulator valve, for example the vacuum modulator valve generally denoted by 470. This includes a modulated pressure chamber 472 to which oil is admitted from the main line 438 and from which oil is vented by an exhaust port 474 under control of a valve stem 476 positioned in response to the balance of force in one direction of pressure in a modulating chamber 478 connected to the modulated pressure chamber 472 and the force in the opposite direction of a spring 480 as modified by the pressure in the intake manifold 482 of the engine which drives the car communicated to a chamber 484 surrounding the spring and closed by a flexible diaphragm 486 exposed to the atmosphere. The modulated pressure chamber 472 is connected through conduit 487 to a modulating chamber 488 in the regulator valve 442 where the pressure of the chamber 488 assists the spring 450 to increase the pressure maintained in main line 438. Whenever the torque demand on the engine is low, the absolute pressure in the manifold is low (vacuum is high) and this reduces the force of spring 480 on valve stem 476 which reduces the pressure in chambers 472 and 488 which reduces the pressure of the main line 438. Thus main line pressure is maintained as a function of torque demand in the manner and for the purposes which are known.

Oil may be supplied to the converter from the regulator valve 442 by a converter supply port 490 and conduit 492 and may be exhausted from the converter to the lubrication passages of the transmission through a pressure-responsive relief valve 494 so that the converter pressure may be maintained at any desired value, customarily below main line pressure and for example 30 pounds per square inch.

The main line 438 is of relatively large cross section and can be connected to any of the clutch chambers. The pressure in the main line is an index of pressure whatever clutch chamber is connected to the main line.

The land 462 closes the converter supply port 490 until a predetermined pressure is built up in the main line 438 and any clutch chamber connected to it. This is to insure that on starting, and when the manual valve is set to engage a clutch, oil will not be diverted from the clutch to the converter in sufficient volume to reduce main line pressure and hence clutch pressure until sufficient pressure has been built up to insure engagement of any of such clutches without slipping. Nevertheless, when the land 462 closes the converter supply port 490, oil can flow slowly to the converter from the front pump through a restricted conduit 496, groove around land 462 and conduit 492. Also, when the converter supply port 490 is closed, oil can flow slowly from the rear pump to the lubrication lines through a restricted conduit 498. The restriction 496 constitutes a passage whose controlling cross section is materially less than the controlling cross section of the connection of the main line to any clutch. Consequently while oil can flow continuously to the converter cavity and hence to the lubricating lines thru passage 496 it cannot flow fast enough to divert sufficient oil from the main line to the converter to reduce main line pressure below a value which will prevent any clutch from slipping. This is important on quick starts where immediately after starting the engine the manual valve is moved to engage a clutch. In such case oil starts flowing to the clutch and to the converter at about the same time. But, it flows to the clutch much faster than it can flow to the converter. Controlling cross section is used in the customary sense of meaning the cross section of a passage which determines the rate of flow thru the passage under any given pressure. This is usually the smallest cross section of a passage of varying cross sections. The controlling cross section of the conduit 492 is larger than the controlling cross section of the passage 496 so that when the land 462 connects main line 438 or regulated pressure chamber 440 with conduit 492 oil can flow rapidly from the source to the converter cavity. However, because the position of land 462 is a measure of the pressure in the main line and is therefore a measure of the pressure in any clutch chamber connected to the main line the conduit 492 cannot be opened to the regulated pressure chamber 440 until that chamber develops a pressure which will prevent any clutch from slipping.

A manual selector valve 500 is supplied with oil from the main line 438 at its inlet 502. The valve is shown in the forward drive position in which oil is supplied to the pressure chamber 254 of the forward torque-establishing device through the space between lands 504 and 506, and the reverse torque-establishing device chambers 269 and 272 are vented through the open end of the bore of the valve at the right of land 506. In order to guide the manual valve stem in the bore while providing communication between the forward clutch chamber 254 and the vent at the left end of the bore, the valve stem is made triangular in cross section. One of the faces of this triangular stem is seen in elevation in FIG. 10, the points of the triangle bearing against the bore.

One advantage of having two reverse chambers, is the provision within the confined space of this transmission, of adequate piston area to provide the necessary force to hold the reverse torque-establishing device. It is to be remembered that, to obtain reverse drive, the second turbine $T_2$ must be held, and this in spite of large forward torque on this turbine. This requires great holding force on the reverse cone, which is achieved by two pistons axially displaced from each other. This effects adequate reverse force without the necessity of increasing the pressure of the main regulating valve.

A neutral clutch relay valve 508 directs oil to the neutral clutch chamber 194 whenever the manual valve 500 is set either to D position to direct oil to chamber 254 for forward drive or to R position to direct oil to chambers 269 and 272 for reverse drive, but the relay valve vents the neutral clutch chamber whenever the manual valve is set to N position in which it blocks the supply to both forward and reverse chambers, and vents both these chambers. The relay valve 508 includes a valve stem 510 urged by a pair of springs 512 and 514 acting on loose collars 515 to a central position in which lands 516 and 518 vent the neutral clutch chamber 194 through an exhaust port 520 and prevent oil from flowing to the neutral clutch chamber 194 from both the forward line and the reverse line. Whenever the manual valve is set for forward drive, oil is supplied to forward chamber 254 and to the space to the left of land 516 which then acts as an expansible chamber motor to move the valve stem 510 to the right against spring 514 to pass oil to clutch chamber 194 and close the vent 520. Likewise whenever the manual valve is set for reverse drive, oil from the reverse line is supplied to the space to the right of land 518 which moves the stem 510 to the left against the spring 512 to close the vent 520 and supply oil to the neutral clutch. This arrangement insures that either cone (which should not be allowed to slip) is firmly set before the neutral clutch, which then completes the drive train. The multiple disk neutral clutch may slip without undue damage. Later engagement of the neutral clutch can be assured by providing that oil flows faster to the forward and reverse chambers than to the neutral clutch chamber. This is symbolically represented in FIG. 10 by the restriction 522 in the flow line to the neutral clutch.

The main line 438 is connected to a stator control valve, generally denoted by 530. This includes a valve stem 532 urged downward, as FIG. 10 is seen, to open an inlet 534 from main line, by a spring 536, the force of which is regulated by the previously mentioned arm 124 connected to the throttle of the engine and acting on spring cap 539. The valve stem is urged upward to close the inlet 534 from the main line and to open an exhaust port 540 by the force of oil in a regulating chamber 542 connected to a regulated pressure chamber 544 between lands 546 and 548. This arrangement maintains in the regulated pressure chamber 544 a pressure which is a function of throttle opening of the engine and hence a function of torque or power demand on the engine. The regulated pressure chamber 544 is connected by a conduit 550 to the previously described throttle control chamber 366 in the stator so that pressure maintained in chamber 366 is a function of torque or power demand on the engine. Thus, the amount by which the vent tube 360 is held to the right of its extreme leftmost position against the spring 364 is a measure of torque demand on the engine or a measure of throttle position and this accordingly positions the stator blades and determines the range of torque multiplication of the torque converter. A stop 552 determines the minimum force of the spring 539.

If it is desired to control the stator at the will of the operator and independently of the torque demand on the engine, the arm 124 is not connected to the throttle but is operated whenever desired.

In this arrangement the stator is controlled in reverse because the manual valve does not affect the supply of oil to the stator control valve 530.

The lubrication lines of the transmission are represented by the pipes marked lube in FIG. 10A. Oil flows from the converter for lubrication through the relief valve 494 and through a cooler 553 and flows from lubrication to the sump 430 as is known. The desired pressure of the lubrication lines may be maintained by a pressure-responsive relief valve 554 which returns excess to the sump by an exhaust or vent port 556. A pressure-responsive bypass valve 558 may supply oil from the converter to lubrication directly if the cooler offers too much resistance to flow.

I claim:

1. A transmission comprising in combination a hydrodynamic torque transmitter, a friction clutch adapted when engaged to complete a drive train which includes the transmitter, means including a fluid pressure chamber for engaging the clutch, a source of fluid under pressure, a conduit having a controlling cross section and being adapted to connect the source to the chamber, a second conduit of small controlling cross section relative to the first conduit constantly connecting the source to the transmitter, a third conduit of large cross section relative to the second conduit and adapted to connect the first conduit to the transmitter, and means responsive to the pressure in the chamber for selectively connecting and disconnecting the third conduit and the first.

2. A transmission comprising in combination a hydrodynamic torque transmitter, a friction clutch adapted when engaged to complete a drive train which includes the transmitter, means including a fluid pressure chamber for engaging the clutch, a source of fluid under pressure, a conduit having a controlling cross section and being adapted to connect the source to the chamber, a second conduit of small controlling cross section relative to the first conduit constantly connecting the source to the transmitter, a third conduit of large cross section relative to the second conduit and adapted to connect the source to the transmitter, and means responsive to the pressure in the chamber for selectively connecting or disconnecting the third conduit and the source.

3. A transmission comprising in combination a prime mover driving a hydrodynamic torque transmitter, a friction clutch adapted when engaged to complete a drive train which includes the transmitter, means including a fluid pressure chamber for engaging the clutch, a source of fluid under pressure driven by the prime mover, a conduit having a controlling cross section and being adapted to connect the source to the chamber, a second conduit of small controlling cross section relative to the first conduit constantly connecting the source to the transmitter, a third conduit of large cross section relative to the second conduit and adapted to connect the source to the transmitter, and means responsive to the pressure in the chamber for selectively connecting and disconnecting the third conduit and the source.

4. Means for driving a vehicle comprising in combination a hydrodynamic torque transmitter driving a friction clutch adapted when engaged to drive the vehicle, means including a fluid pressure chamber for engaging the clutch, a lubricating passage, means for supplying fluid under pressure in response to movement of the vehicle, a conduit having a controlling cross section and being adapted to connect the source to the chamber, a second conduit of small controlling cross section relative to the first conduit constantly connecting the source to the lubricating passage, a third conduit of large controlling cross section relative to the second conduit and adapted to connect the source to the lubricating passage, and means responsive to the pressure in the chamber for selectively connecting and disconnecting the third conduit and the first conduit.

5. Means for driving a vehicle comprising in combination a hydrodynamic torque transmitter driving a friction clutch adapted when engaged to drive the vehicle, means including a fluid pressure chamber for engaging the clutch, a lubricating passage, a source of fluid under pressure operated in response to movement of the vehicle, a conduit having a controlling cross section and being adapted to connect the source to the chamber, a second conduit of small controlling cross section relative to the first conduit constantly connecting the source to the lubricating passage, a third conduit of large controlling cross section relative to the second conduit and adapted to connect the first conduit to the lubricating passage, and means responsive to the pressure in the chamber for selectively connecting and disconnecting the third conduit and the source.

6. Means for driving a vehicle comprising a prime mover driving a hydrodynamic torque transmitter which drives a friction clutch which is adapted when engaged to complete a power train between the prime mover and the vehicle, means including a fluid pressure chamber for engaging the clutch, a first source of fluid under pressure driven by the prime mover, a second source of fluid under pressure driven in response to movement of the vehicle, a common fluid pressure outlet for said sources, a first conduit having a controlling cross section and being adapted to connect the outlet to the chamber, a second conduit of small controlling cross section relative to the first conduit constantly connecting the first source to the transmitter, a lubrication passage connected to the outlet of the transmitter, a third conduit of small controlling cross section relative to the first conduit constantly connecting the second source of pressure to the lubrication passage, a fourth conduit of large cross section relative to the third conduit and being adapted to connect the outlet to the transmitter and means responsive to pressure in the chamber for selectively connecting and disconnecting the fourth conduit and the outlet.

References Cited in the file of this patent

UNITED STATES PATENTS

| | | |
|---|---|---|
| 2,750,018 | Dundore | June 12, 1956 |
| 2,821,095 | Kelley | Jan. 28, 1958 |
| 2,845,817 | Polomski | Aug. 5, 1958 |
| 2,903,910 | Carnegie | Sept. 15, 1959 |